(12) United States Patent
Noyan

(10) Patent No.: US 11,859,691 B2
(45) Date of Patent: Jan. 2, 2024

(54) ROPE FIXING APPARATUS FOR PLEATED AND HONEYCOMB CURTAIN SYSTEM

(71) Applicant: PLICELL TEKSTIL SANAYI VE TICARET ANONIM SIRKETI, Bursa (TR)

(72) Inventor: Asim Berk Noyan, Bursa (TR)

( * ) Notice: Subject to any disclaimer, the term of this patent is extended or adjusted under 35 U.S.C. 154(b) by 121 days.

(21) Appl. No.: 17/510,093

(22) Filed: Oct. 25, 2021

(65) Prior Publication Data
US 2023/0128227 A1   Apr. 27, 2023

(51) Int. Cl.
*E06B 9/326*   (2006.01)
*F16G 11/00*   (2006.01)
*E06B 9/327*   (2006.01)
*E06B 9/262*   (2006.01)
*E06B 9/266*   (2006.01)

(52) U.S. Cl.
CPC .............. *F16G 11/00* (2013.01); *E06B 9/262* (2013.01); *E06B 9/327* (2013.01); *E06B 9/266* (2013.01); *E06B 2009/2627* (2013.01)

(58) Field of Classification Search
CPC .... F16G 11/048; F16G 11/044; F16G 11/101; F16G 11/02; F16G 11/00; Y10T 24/3936; Y10T 24/3956; Y10T 24/39; Y10T 24/3996; Y10T 24/398; Y10T 24/3969; E06B 9/327
See application file for complete search history.

(56) References Cited

U.S. PATENT DOCUMENTS

| | | | | |
|---|---|---|---|---|
| 319,591 A | * | 6/1885 | Magee | F16G 11/04 24/132 R |
| 824,556 A | * | 6/1906 | Lowry et al. | F16G 11/04 24/136 R |
| 1,244,093 A | * | 10/1917 | Johnson | F16G 11/04 24/115 M |
| 4,236,281 A | * | 12/1980 | Bottum | F16G 11/14 29/447 |
| 4,455,717 A | * | 6/1984 | Gray | F16G 11/025 24/115 M |
| 4,939,831 A | * | 7/1990 | Doninger | B25B 33/00 29/263 |
| 5,136,756 A | * | 8/1992 | Krauss | F16G 11/048 24/132 R |
| 5,170,538 A | * | 12/1992 | Zarembo | F16G 11/02 D8/367 |
| 5,289,613 A | * | 3/1994 | Kohl | F16G 11/02 16/108 |
| 9,382,757 B1 | * | 7/2016 | Kirk | A47H 11/04 |
| 2004/0134039 A1 | * | 7/2004 | Tracy | A44B 99/00 24/3.4 |
| 2005/0086766 A1 | * | 4/2005 | Fawcett, Jr. | F16G 11/101 16/110.1 |
| 2012/0000036 A1 | * | 1/2012 | Wen | F16G 11/101 24/115 F |

FOREIGN PATENT DOCUMENTS

CN   202723505 U   2/2013

* cited by examiner

*Primary Examiner* — Robert Sandy
*Assistant Examiner* — Michael S Lee
(74) *Attorney, Agent, or Firm* — Egbert, McDaniel & Swartz, PLLC

(57) ABSTRACT

A rope fixing apparatus for use in pleated or honeycomb curtain systems for all kinds of stable, movable or folding windows, doors and glass balconies.

9 Claims, 5 Drawing Sheets

ROPE FIXING APPARATUS FOR PLEATED AND HONEYCOMB CURTAIN SYSTEM

CROSS-REFERENCE TO RELATED APPLICATIONS

Not applicable.

BACKGROUND OF THE INVENTION

1. Field of the Invention

The present invention relates to pleated or honeycomb curtain systems used by being connected on all kinds of stable, movable or folding windows, doors, glass balconies.

The invention is particularly related to a rope fixing apparatus enabling the ropes which provide the connection and movement of fabrics and profiles in the pleated or honeycomb curtain systems to be tightened, fixed without a set screw or without being knotted and also enabling the tension adjustments of the curtain system to be performed practically without having to loosen and retighten the tightened ropes.

2. Description of Related Art Including Information Disclosed Under 37 CFR 1.97 and 37 CFR 1.98

Today, pleated or honeycomb curtain systems that are a type of curtain similar to roller blinds supplanted by classical curtains with cornices are widely used in windows, doors, glass balconies.

Pleated or honeycomb curtain systems generally consist of pleated or honeycomb curtain fabric, which is located between the upper profile and the lower profile and opens and closes up and down on the ropes. Said pleated and honeycomb curtain fabric is opened and closed with the upward or downward movement of the upper profile and lower profile, and also it provides a functional use by leaving it on the glass in an intended place.

In the state of the art, the most common method is that the ropes connecting the upper and lower profiles to each other and enabling them to move are tightened to an apparatus by means of a screw or bolt, mostly a set screw, by being knotted and are mounted by passing them to another apparatus that is screwed to the surface where the curtain will be used. The rope fixing apparatus used in the present application basically consists of two parts, an upper part and a lower part. Said lower part is connected with screws to each corner of the sill where the pleated or honeycomb curtain will be mounted. The rope that has to be fixed during the mounting is tightened to the upper part with the help of screw or bolt or knot and it is provided that it remains stable. After then, the upper part is passed through the lower part mounted at the corners and the mounting of the pleated or honeycomb curtain is completed. However, in the mounting process, the ropes tightened to the upper part loosen and open over time. The method of knotting the rope is applied to avoid this situation. This method is a time-consuming process for the installer and causes a problem in terms of aesthetics. Also, the degree of difficulty of knotting changes according to the structure of the rope used, and therefore, it is difficult for the installers. In addition, there is difficulty in opening and reclosing the screw or bolt when the tension adjustment is required during the mounting or when the curtain has to be removed and reattached for cleaning.

The document No CN202723505 can be shown as an example of the state of art in the research carried out in the literature. Said document is related to a fixing apparatus for curtain binding rope. Said fixing apparatus basically has a guide rope fixing slot body and a tightening notch part on both sides of one end of said guide rope fixing slot body. The inner sides of the tightening notch parts extend downwards with a clamping fixing part, respectively. A groove is formed between the clamping fixing parts. The lower surface of the guide rope fixing slot body and the two different edges of the tightening notch parts include a wire groove portion that is inwardly inserted. Said apparatus can only be mounted with a tightening hand tool and causes usage difficulties.

As a result, the presence of the abovementioned problems and the inadequacy of the present solutions made it necessary to perform an improvement in the relevant technical field.

The Object of the Invention

The present invention is related to a rope fixing apparatus for pleated or honeycomb curtain systems that eliminates the above mentioned disadvantages and brings new advantages to the related technical field.

The main object is the invention is to enable the ropes providing the connection and movement of fabrics and profiles in pleated or honeycomb curtain systems are tightened and fixed without a set screw or knot.

The invention is to enable the tension adjustments of the curtain system to be performed practically without having to loosen and retighten the tightened ropes.

Another object of the invention is to present a practical solution that eliminates screw, knot or clip opening and tightening processes in tension adjustments required during the mounting.

Another object of the invention is to provide an ergonomic use to the installer of the curtain system by eliminating the use of a set screw or the need for knotting.

Another object of the invention is to provide easy and comfortable mounting processes in the curtain system.

Another object of the invention is to enable the curtain user to easily perform the mounting of the curtain and adjust the tension without the need for an expert, without opening the rope tightening apparatus and removing the ropes from the apparatus when the curtain system needs to be cleaned.

BRIEF SUMMARY OF THE INVENTION

In order to perform all of the objects described above and which may arise from the detailed description, the invention is a rope fixing apparatus enabling the ropes connecting the upper profile and lower profile by passing them through the curtain to be tightened and to be fixed in the required tension adjustment in the pleated or honeycomb curtain systems used in all kinds of fixed, moving or folding windows, doors, glass balconies by being connected, and comprises the following:

a lower section with a V-shaped recessed nail space on its inner surface to enable the rope to be tightened and fixed, an upper section with a V-shaped protruding nails on its inner surface and which enables the rope to be adjusted to the desired tension by moving back and forth on the lower section, an upper part with a perforated middle part between the upper part and the lower part to enable said upper part and lower part to be folded in half and closed on each other, a clip slot in recess form located mutually on both sides on the lower section to enable the upper section and lower section to be fixed each other when the upper section and lower section are closed on each other by being folded from the middle section, and a clip retainer in protrusion form fixed by snapping into the clip slot mutually on both sides, a lower part having one slide in height of the upper part mutually on both sides and connecting the upper part passed through the slide to the area where the pleated or honeycomb curtain system will be used by locking it with the inward curved slide roof, and enabling the rope to be fixed in a way that it does not come out of the upper part.

The structural and characteristic features of the invention and its advantages will be understood more clearly by means of the figures given below and the detailed description written referring to these figures. Therefore, the evaluation needs to be performed by taking these figures and detailed description into account.

DESCRIPTION OF THE PART REFERENCES

Figure 1:
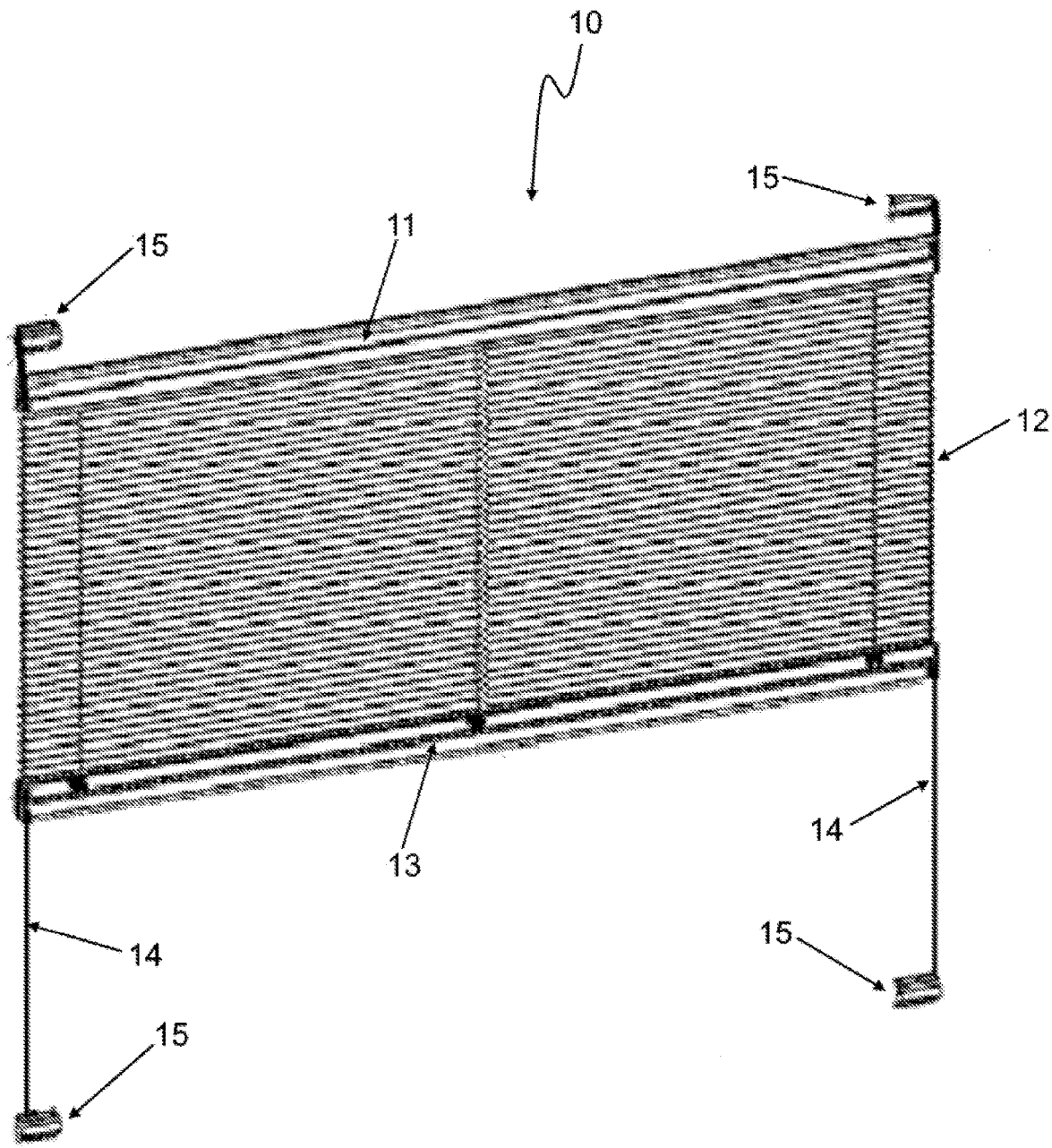
FIG. 1 Is a perspective view of the rope fixing apparatus of the invention mounted on the pleated or honeycomb curtain system.

100. Upper part
110. Upper section
111. Clip retainer
112. Nail
120. Middle section
121. Hole
130. Lower section
131. Clip slot
132. Nail space
200. Lower part
201. Hole
210. Slide
211. Slide roof
220. Inlet slot opening
230. Inlet slot end
240. Mounting hole
10. Pleated or honeycomb curtain system
11. Upper profile
12. Curtain
13. Lower profile
14. Rope
15. Rope fixing apparatus

DETAILED DESCRIPTION OF THE INVENTION

In this detailed description, the preferred alternatives of the rope fixing apparatus (A5) of the invention is described only for a better understanding of the subject without any limiting effects.

In FIG. 1, the pleated or honeycomb curtain system (10) is seen. Said pleated or honeycomb curtain system (10) basically comprises the upper profile (11) forming the upper edge of the pleated or honeycomb curtain system (10) and enabling the pleated or honeycomb curtain system (10) to open and close up and down, the curtain (12) connected under the upper profile (11), the lower profile (13) forming the lower edge of the pleated or honeycomb curtain system (10) by being connected under the curtain (12) and enabling the pleated or honeycomb curtain system (10) to open and close up and down, the rope (14) attaching the upper profile (11) and lower profile (13) each other by passing through the curtain (12), the rope fixing apparatus (15) enabling the rope (14) to be fixed to the upper profile (11) and lower profile (13) and also the application area of the pleated or honeycomb curtain system (10) in the required tension adjustment.

Figure 2:
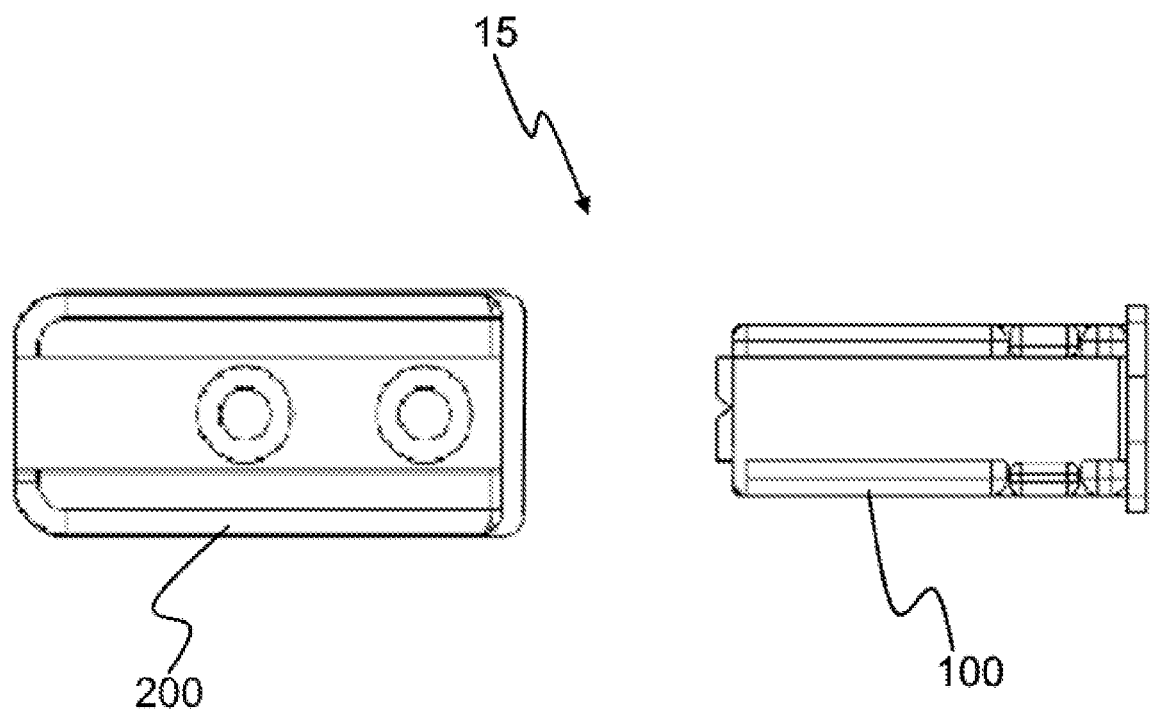
FIG. 2 Is a demounted view of the rope fixing apparatus of the invention.

In FIG. 2, a demounted view of the rope fixing apparatus (15) of the invention is given. Accordingly, the rope fixing apparatus (15) basically comprises an upper part (100) that can open and close as a clip enabling the rope (14) to be fixed in the required tension adjustment, the lower part (200) locking the upper part (100) by passing it through and connecting the upper part (100) to the area where the pleated or honeycomb curtain system (10) will be used and also enabling the rope (14) to be fixed in a way that it does not come out of the upper part (100).

Figure 3:
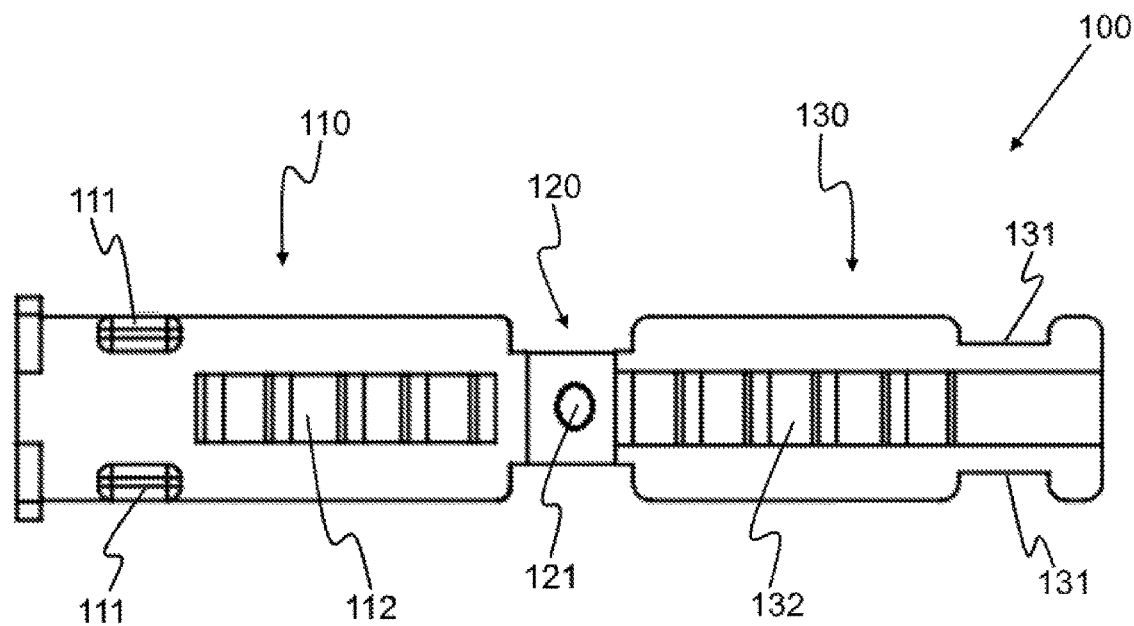
FIG. 3 Is an open view of the upper part of the rope fixing apparatus of the invention.

The upper part (100) that can open and close as a clip in FIG. 3 basically consists of an upper section (110) with V-shaped protruding nails (112) on its inner surface, a lower section (130) with V-shaped recessed nail space (132) in accordance with the form of said nails (112) on its inner surface and a middle section (120) in the perforated (121) structure between said upper section (110) and lower section (130).

The middle section (120) is made of a material that is less rigid than the upper section (110) and the lower section (130). Therefore, the upper part (110) and the lower part (130) can be folded two from the middle section (120) and closed on each other to make the rope (14) to be fixed in the required tension adjustment. The upper section (110) has the ability of moving back and forth on the lower section (130).

When the upper part (110) and the lower part (130) can be folded two from the middle section (120) and closed on each other, the V-shaped protruding nails (112) are closed on the V-shaped recessed nail spaces (132). Said nails (112) and nail spaces (132) closed on the nails (112) enable the rope (14) passed through the hole (121) in the middle section (120) to be fixed by tightening and enable the rope to be brought to the desired tension adjustment by means of moving the upper section (110) back and front on the lower section (130). The hole (121) located on the middle section (120) and enabling the rope (14) to enter into the upper part (100) may be in a circle, triangle or different geometric shape.

Figure 4:
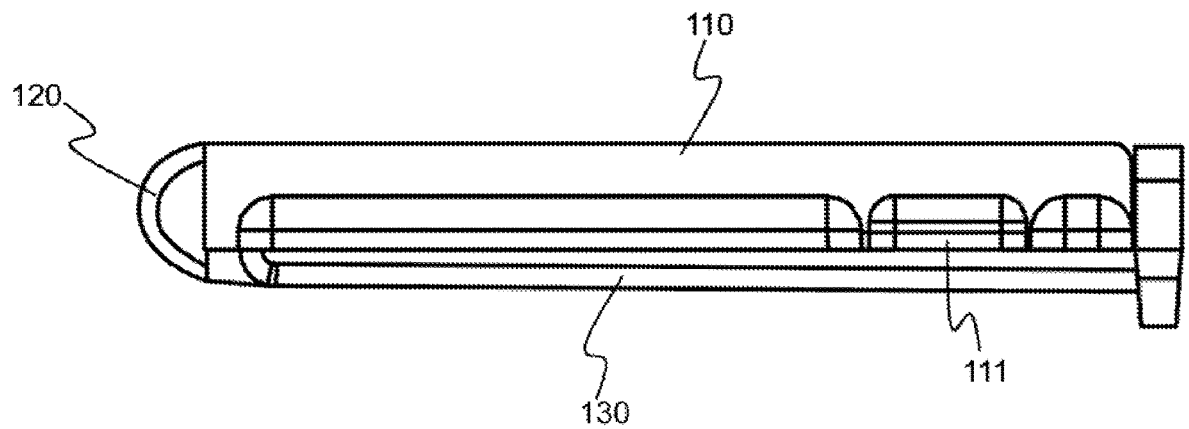
FIG. 4 Is a close view of the upper part of the rope fixing apparatus of the invention.

When the upper part (110) and the lower part (130) can be folded two from the middle section (120) and closed on each other, there is a clip slot (131) in the form of recess mutually on both sides on the lower section (130) to fix the upper section (110) and lower section (130) and a clip retainer (111) in the form of protrusion fixed by passing to said clip slot (131) mutually on both sides on the upper section (110). When the upper part (110) and the lower part (130) can be folded two from the middle section (120) and closed on each other, the clip retainers (111) on the upper section (110) as seen in FIG. 4 are fixed by passing to the clip slots (131) on the lower section (130).

Figure 5A:
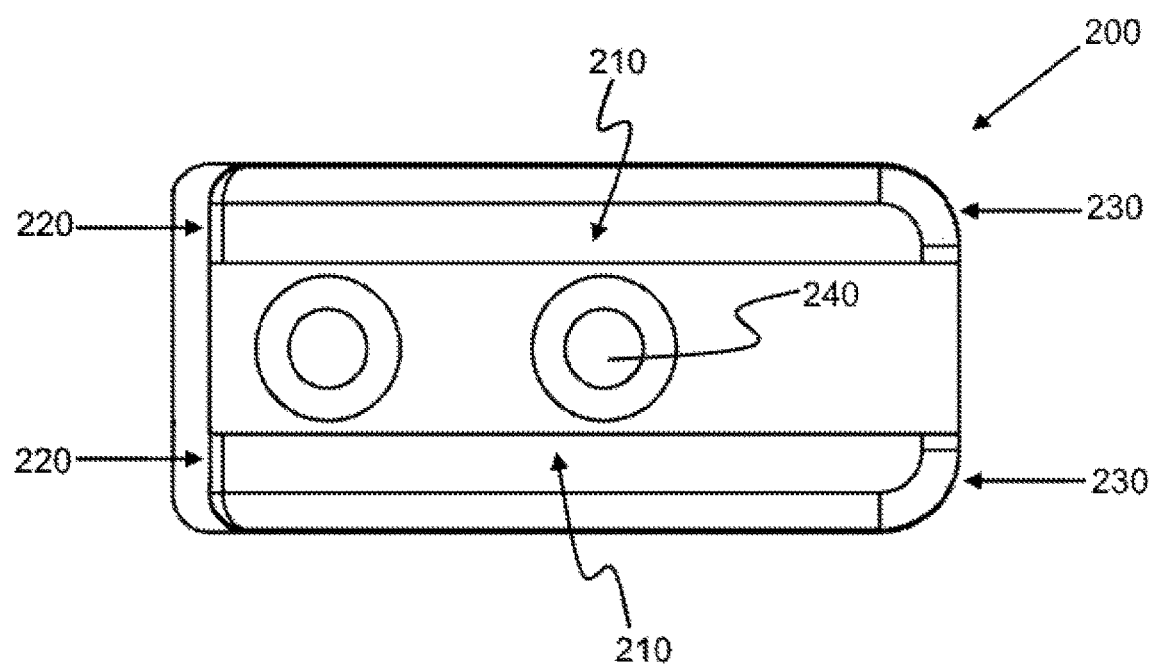
FIG. 5a Is a top view of the lower part of the rope fixing apparatus of the invention.
Figure 5B:
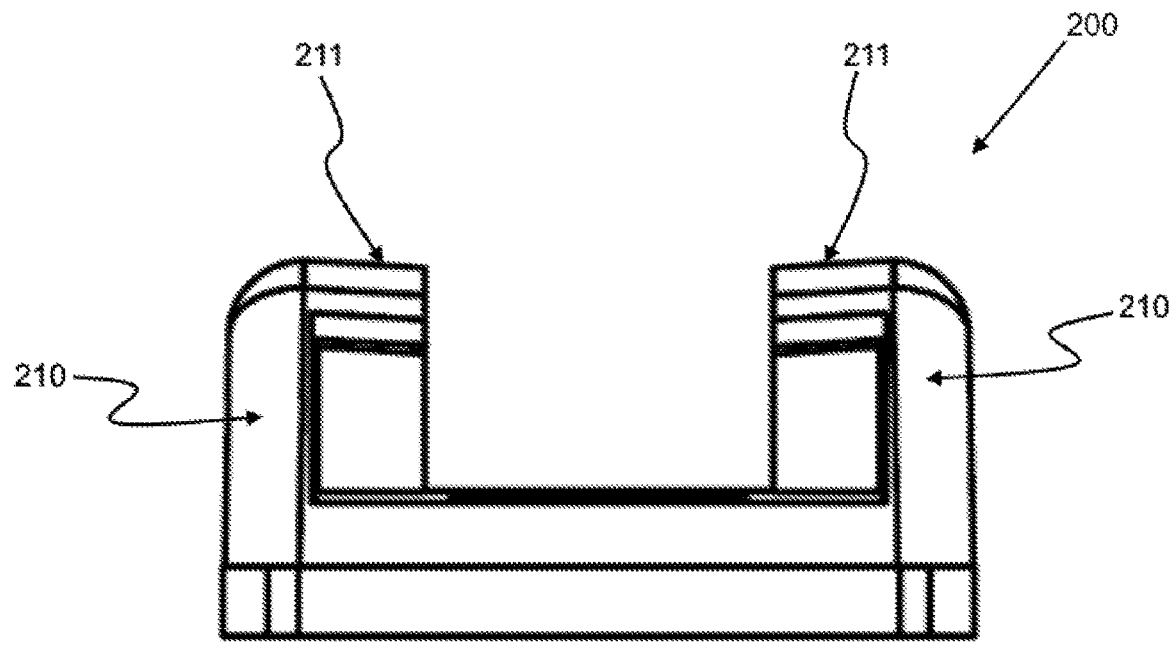
FIG. 5b Is a front view of the lower part of the rope fixing apparatus of the invention.
Figure 5C:
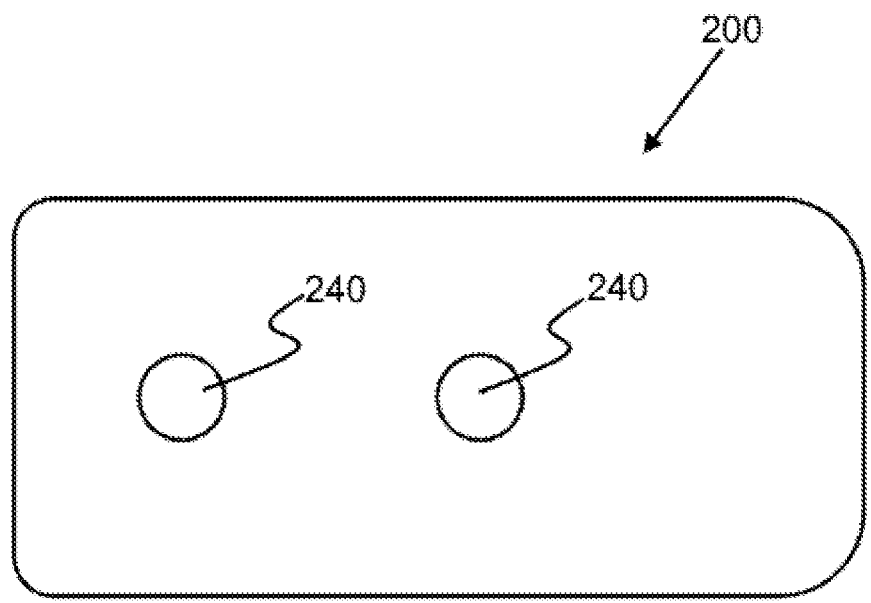
FIG. 5c Is a bottom view of the lower part of the rope fixing apparatus of the invention.

The lower part (200) enabling the upper part (100) to be connected to the area where the pleated or honeycomb curtain system (10) will be used and enabling the rope (14) to be fixed in a way that it does not come out of the upper part (100) has a slide (210) in height of the upper part (100) mutually on both sides as seen in FIG. 5. The inlet slot opening (220) forming one end of said slide (210) is open in order to make the upper part (100) enter the lower part (200). The inlet slot end (230) forming the other end of said slide (210) is close in order to make the upper part (100) to be fixed to the lower part (200).

The slide roof (211) on the slide (210) is in an inward curved structure as seen in FIG. 5*b* in order to lock the upper part (100) into the lower part (200) and to fix the rope (14) into the upper part (100) with said locking. Therefore, it is provided that the upper part (100) passed into the slide (210) is locked by tightening into the slide (210) by means of the inward curved slide roof (211) and the rope (14) is fixed in a way that it does not come out of the upper part (100).

There is at least one mounting hole (240) on the lower part (200) to provide that the pleated or honeycomb curtain system (10) is fixed to the application area.

The working principle of the rope fixing apparatus (15) of the invention is as follows.

The rope (14) of the pleated or honeycomb curtain system (10) is passed through the hole (121) in the middle section (120) when the upper part (100) is open and the upper section (110) and the lower section (130) is folded two from the middle section (120) and closed on each other. In the meantime, the clip retainers (111) on the upper section (110) pass to the clip slots (131) on the lower section (130).

When the upper part (110) and the lower part (130) are folded two from the middle section (120) and closed on each other, the rope (14) passed through the hole (121) stands stable by tightening between the nails (112) and the nail spaces (132) closed on the nails (112). The upper section (110) is moved back and front on the lower section (130) in order to adjust the tension of the rope (14) when necessary and it is provided that the rope is brought to the desired tension adjustment.

After the adjustment, the upper part (100) is passed to the slide (210) on the lower part (200) connected to the sills by means of the mounting holes (240) in the application area of the pleated or honeycomb curtain system (100) by means of the inlet slot opening (220). The upper part (100) is moved by being pushed along the slide (210) and the upper part (100) bears to the inlet slot end (230). In the meantime, it is provided that the upper part (100) is locked by tightening into the slide (210) by means of the inward curved slide roof (211) and is fixed in a way that it does not come out of the upper part (100).

In the pleated or honeycomb curtain system (10), it is provided that the curtain (12) opens and closes on the ropes (14) by moving the upper profile (11) and/or the lower profile (13) up and down.

I claim:

1. A rope fixing apparatus for enabling a rope to connect an upper profile and a lower profile together and to pass through a pleated or honeycomb curtain and to be fixed at a desired tension, the rope fixing apparatus for use with movable or folding windows, doors or glass balconies, the rope fixing apparatus comprising:
   an upper part having a lower section with a V-shaped recess nail space on an inner surface and having an upper section with V-shaped protruding nails, said upper part adapted to enable the rope to be tightened and fixed and adjustable to a desired tension by moving the rope back-and-forth in said upper part, said upper part having a perforated middle part between the upper section and the lower section so as to allow said upper part to be folded in half to close the upper section and the lower section to each other;
   a clip slot having a recess on opposite sides on the lower section so as to fix the upper section and the lower section when the upper section and the lower section are folded upon each other;
   a clip retainer defining a protrusion on opposite sides of the upper section so as to fix said clip slot; and
   a lower part having a slide with a height dimension and an inward curved slide roof, wherein said upper part passes through the slide under the inward curved slide roof so as to fix the rope within said upper part.

2. The rope fixing apparatus of claim 1, wherein the perforated middle part has a hole that enables the rope to enter said upper part.

3. The rope fixing apparatus of claim 2, wherein the hole has a circular shape.

4. The rope fixing apparatus of claim 2, wherein the hole has a triangular shape.

5. The rope fixing apparatus of claim 1, further comprising:
   an inlet slot opening formed at one end of the slide so as to allow said upper part to enter said lower part.

6. The rope fixing apparatus of claim 1, further comprising:
   an inlet slot end formed as a closed slot on an opposite end of said clip slot so as to fix said upper part within said lower part.

7. The rope fixing apparatus of claim 1, wherein the inward curved slide roof tightens onto said upper part so as to allow the rope to be fixed in said upper part.

8. The rope fixing apparatus of claim 1, further comprising:
   at least one mounting hole located on said lower part and adapted to allow the rope fixing apparatus to be fixed to the movable or folding windows, doors or glass balconies.

9. The rope fixing apparatus of claim 1, wherein the perforated middle part is formed of a material that is less rigid than a material of the upper section and the lower section.

* * * * *